US008233742B2

(12) United States Patent
Masuda

(10) Patent No.: US 8,233,742 B2
(45) Date of Patent: Jul. 31, 2012

(54) METHOD AND PROGRAM FOR REGISTRATION OF THREE-DIMENSIONAL SHAPE

(75) Inventor: Takeshi Masuda, Ibaraki (JP)

(73) Assignee: National Institute of Advanced Industrial Science and Technology (JP)

( * ) Notice: Subject to any disclaimer, the term of this patent is extended or adjusted under 35 U.S.C. 154(b) by 1240 days.

(21) Appl. No.: 11/921,572

(22) PCT Filed: May 10, 2006

(86) PCT No.: PCT/JP2006/309384
§ 371 (c)(1),
(2), (4) Date: Dec. 5, 2007

(87) PCT Pub. No.: WO2006/132046
PCT Pub. Date: Dec. 14, 2006

(65) Prior Publication Data
US 2009/0128546 A1    May 21, 2009

(30) Foreign Application Priority Data

Jun. 7, 2005    (JP) ................................. 2005-167297
Dec. 27, 2005   (JP) ................................. 2005-376450

(51) Int. Cl.
*G06K 9/36*    (2006.01)
*G06K 9/32*    (2006.01)

(52) U.S. Cl. ......................... 382/294; 382/280; 382/295
(58) Field of Classification Search .................. 382/294, 382/295, 298, 300, 264, 254, 293, 266, 276, 382/277, 278, 280
See application file for complete search history.

(56) References Cited

U.S. PATENT DOCUMENTS
6,118,475 A * 9/2000 Iijima et al. ..................... 348/42
(Continued)

FOREIGN PATENT DOCUMENTS
JP    09-138866    11/1995
JP    10-074272    8/1996
(Continued)

OTHER PUBLICATIONS

Fredrik Viksténs, Anders Moe. Local Single-Patch Features for Pose Estimation Using the Log-Polar Transform. In Proceedings of IbPRIA (1)'2005. pp. 44-51.*

(Continued)

*Primary Examiner* — Andrae S Allison
(74) *Attorney, Agent, or Firm* — Stites & Harbison, PLLC; Juan Carlos A. Marquez, Esq.

(57) ABSTRACT

As a feature, a local range image described in a log-polar coordinate system with a tangential plane set as an image plane is used. In a created image, ambiguity concerning an angular axis around the normal is normalized as a power spectrum using Fourier series expansion and changed to an amount invariable with respect to rotation. The power spectrum is dimensionally compressed by expanding the power spectrum in a peculiar space using a peculiar vector. Corresponding points are searched by nearest neighbor in a dimensionally compressed space to calculate a correspondence relation among the points. Wrong correspondence is removed by verification to determine a positional relation among range images. A reliable correspondence relation is narrowed down by verification by cross-correlation and a RANSAC to create a tree structure representing a link relation among the range images. A shape mode is created by applying a simultaneous registration method to plural range images of the tree structure using a result of this registration as an initial value.

4 Claims, 8 Drawing Sheets

U.S. PATENT DOCUMENTS

| | | | |
|---|---|---|---|
| 6,628,845 B1* | 9/2003 | Stone et al. | 382/294 |
| 6,694,054 B1* | 2/2004 | Gardes et al. | 382/181 |
| 7,848,576 B2* | 12/2010 | Iizuka | 382/209 |
| 7,853,098 B2* | 12/2010 | Hardy et al. | 382/294 |
| 2002/0146163 A1* | 10/2002 | Frisken et al. | 382/154 |
| 2004/0218815 A1* | 11/2004 | Iizuka | 382/209 |
| 2007/0122060 A1* | 5/2007 | Hardy et al. | 382/286 |
| 2008/0232713 A1* | 9/2008 | Iizuka | 382/281 |

FOREIGN PATENT DOCUMENTS

JP  2003-162549  11/2001

OTHER PUBLICATIONS

Otsu et al, A New Scheme for Practical Flexible and Intelligent Vision Systems, IAPR Workshop on CV—Special Hardware and Industrial Applications Oct. 12-14, 1988, Tokyo.*

Robust and efficient Fourier-Mellin transform approximations for Gray-level image reconstruction and complete invariant description, Computer Vision and Image Understanding, v.83 n. 1, p. 57-78, Jul. 2001.*

Masuda, T.; , "Automatic Registration of Multiple Range Images by the Local Log-Polar Range Images," 3D Data Processing, Visualization, and Transmission, Third International Symposium on , vol., No., pp. 216-223, Jun. 14-16, 2006.*

Masuda T., "Production of Modeling Object Shapes from Multiple Shape Measurements", The Society of Instrument and Control Engineers, vol. 8, Nov. 14, 2003, pp. 25-32, in Japanese with English Abstract.

International Search Report for PCT/JP2006/309384 dated Jun. 13, 2006.

* cited by examiner

| $N_\theta$ | $R$ | $N_\xi$ | $D_{FLR}$ | $D$ | CP% | $\epsilon$ | #inliers | registered $S^\alpha$ |
|---|---|---|---|---|---|---|---|---|
| 16 | 2 | 4 | 64 | 8 | 90.6 | 0.83 | 0 | none |
| 16 | 4 | 8 | 128 | 8 | 93.8 | 3.92 | 235 | all |
| 16 | 8 | 11 | 176 | 8 | 92.9 | 10.83 | 368 | all |
| 16 | 16 | 15 | 240 | 8 | 89.3 | 29.26 | 106 | /1,2,6/4,8,9/ |
| 16 | 8 | 11 | 176 | 2 | 73.5 | 0.66 | 11 | /1,2,3/ |
| 16 | 8 | 11 | 176 | 4 | 86.9 | 5.22 | 171 | /1,2,3,6,10/ |
| 16 | 8 | 11 | 176 | 16 | 96.1 | 11.50 | 552 | all |
| 3 | 8 | 2 | 6 | 6 | 99.8 | 0.55 | 217 | all |
| 4 | 8 | 3 | 12 | 8 | 99.0 | 1.67 | 459 | all |
| 8 | 8 | 6 | 48 | 8 | 94.4 | 4.94 | 428 | all |

METHOD AND PROGRAM FOR REGISTRATION OF THREE-DIMENSIONAL SHAPE

TECHNICAL FIELD

The present invention relates to a method and a program for registration of a three-dimensional shape that can be used in an industrial production field, a digital content creation field, cultural property protection, simulation, and robot navigation that require modeling from an actual object, three-dimensional object shape recognition and three-dimensional shape search conducted by performing matching with respect to an existing shape model, and the like.

BACKGROUND ART

In order to measure a three-dimensional shape, sensors based on various principles such as stereo, an light sectioning method, a focus, a blur, special encoding, and an optical radar have been proposed. However, since a sensor based on an optical principle uses an image sensor as a light-receiving element, in general, data is acquired as a range image in which three-dimensional shape information corresponds to pixels. The range image is an important input form of three-dimensional shape information for recognition of an object and shape model creation in the field of CV, CG, CAD, VR, and robots.

In many cases, in the range image, only a part of a surface of an object body can be measured. In order to create a shape model for an entire surface of an object, it is necessary to measure an object from various directions. Respective range images are represented by coordinate systems of the center of a sensor. To combine the range images into one shape model, it is necessary to calculate a positional relation among the respective range images. Estimation of such a positional relation from data is registration.

Registration of the range images can be divided into two stages, i.e., coarse registration and fine registration. At the stage of the coarse registration, registration for limiting errors among range images measured from completely different viewpoints within a certain degree of error range is performed. Once registration can be performed coarsely, it is possible to apply the fine registration with the coarse registration set as an initial value. An ICP (Iterative Closest Point) algorithm (see Non-Patent Document 1), a direct method (see Non-Patent Documents 2 and 3), and a modeling method by simultaneous registration (see Non-Patent Document 4) are registration methods belonging to a fine stage. The present invention proposed a registration method at a coarse stage and performs model creation by applying a fine registration method using the registration at the coarse stage as an initial value.

The coarse registration can be obtained by attaching a marker to an object, using an electromagnetic positioning device such as a GPS, or using an active device such as a turning table or a robot arm. However, depending on a size, a material, and a measurement environment of an object, such devices cannot always be used. Such information is not always provided together with data. It is also possible to manually apply the coarse registration using a GUI. However, when the number of data increases, since labor of work is large, it is desirable to support the work with a computer.

The coarse registration method is deeply related to researches performed as object recognition. A most representative method is a method of using a feature invariable with respect to a geometric transformation (in the case of a rigid body, a Euclidean transformation) for registration. A curvature is an invariable amount defined by differential geometry and can be mathematically calculated from an ultimately micro-area. In calculating a curvature from an actual range image, various contrivances have been proposed to stably calculate the curvature using data in a finite range (see Non-Patent Document 5). However, most of the contrivances are based on local application of some consecutive function to discrete data. In Feldmar and Ayache (see Non-Patent Document 6), coarse registration is performed by applying a RANSAC (a robust model estimation algorithm realized by repeatedly verifying, with all data, a hypothesis created on the basis of a minimum number of samples selected at random; see Non-Patent Document 30) to a set of local orthogonal bases formed by a main direction and the normal obtained in calculating a curvature. The curvature is represented by two components (maximum–minimum, Gaussian–average, or curvedness–shape index) (see Non-Patent Document 7) and is not always sufficient information for performing association. It is necessary to select the curvature from many candidates by methods such as random sampling and voting. It is possible to reduce searches for candidates and perform stable registration by also using more general information incidental to the curvature. In Kehtarnavaz and Mohan (see Non-Patent Document 8), areas divided according to a sign of a curvature are represented by a graph and registration is performed by partial graph matching. In Higuchi et al. (see Non-Patent Document 9), estimation of a rotation component is estimated by matching of amounts similar to a curvature mapped on a unit spherical surface. In Krsek et al. (see Non-Patent Document 10), matching of curved lines with an average curvature of 0 is performed by random sampling.

It can be said that a method of dividing an input shape into segments of partial shapes and matching segments represented by similar parameters uses a relatively significant characteristic. Faugeras and Herber divide a curved surface with a plane or a secondary curved surface and perform registration by verifying a hypothesis of a correspondence relation among divided segments (see Non-Patent Document 11). Kawai et al. (see Non-Patent Document 12), a triangular patch is used. In these methods based on segments, it is assumed that division into segments (segmentation) can be stably performed. However, corresponding segments are not always divided in the same manner in a free curved surface including noise or occlusion. In Wyngaerd and Van Gool (see Non-Patent Document 13), registration is performed using a bitangent curve drawn by a straight line that is in contact with a curved surface in two places.

A characteristic based on a micro-area has problems in stability and a description ability and a global characteristic has problems in stability of segmentation and robustness against occlusion. Stein and Medioni propose a feature called "splash" calculated from the normal of a curved surface on a circumference surrounding a center vertex (see Non-Patent Document 14). Chua and Jarvis propose a point signature calculated from a curved line obtained by projecting an intersection of a curved surface and a spherical surface on a tangential plane (see Non-Patent Document 15). Johnson and Hebert set, as a spin image, a histogram image of measurement points collected by rotating an image plane perpendicular to a tangential plane at a center vertex around the normal (see Non-Patent Document 16) and apply the spin image to symmetry recognition. In the spin image, corresponding point search is performed in a space dimensionally compressed by peculiar image expansion. Huber and Herbert propose a method of performing automatic registration of plural range images by using a spin image and combining the spin image with verification based on appearance (see Non-Patent Document 17). These methods are attempts to facilitate correspondence search by obtaining description of abundant information from an area wider than a curvature.

There is also an approach of solving registration by optimizing an error function describing a state of registration instead of performing association by features. A satisfactory initial value is not provided for coarse registration and a space of parameters to be searched is large. Thus, a probabilistic optimization method is used. Blais and Levine use simulated annealing (SA) (see Non-Patent Document 18) and Brunnstrom and Stoddart search for an optimum correspondence with a genetic algorithm (GA) (see Non-Patent Document 19). Sliva et al. solve registration of plural range images by optimizing registration parameters with a GA such that an error function is minimized (see Non-Patent Document 20). Such methods based on probabilistic optimization have to evaluate the error function an extremely large number of times.

Non-Patent Document 1: P. J. Besl and N. D. McKay: "A method for registration of 3-D shapes", IEEE Transactions on Pattern Analysis and Machine Intelligence, 14, 2, pp. 239-256 (1992).

Non-Patent Document 2: B. K. P. Horn and J. G. Harris: "Rigid body motion from range image sequences", CVGIP: Image Understanding, 53, 1, pp. 1-13 (1991).

Non-Patent Document 3: M. Yamamoto, P. Boulanger, J.-A. Beraldin and M. Rioux: "Direct estimation of range flow on deformable shape from a video rate range camera", IEEE Transactions on Pattern Analysis and Machine Intelligence, 15, 1, pp. 82-89 (1993).

Non-Patent Document 4: T. Masuda: "Registration and integration of multiple range images by matching signed distance fields for object shape modeling", Computer Vision and Image Understanding, 87, pp. 51-65 (2003).

Non-Patent Document 5: P. J. Besl and R. C. Jain: "Invariant surface features for 3D object recognition in range images", Computer Vision, Graphics, and Image Processing, 33, pp. 33-80 (1986).

Non-Patent Document 6: J. Feldmar and N. Ayache: "Rigid, affine and locally affine registration of free-form surfaces", International Journal of Computer Vision, 18, 2, pp. 99-119 (1996).

Non-Patent Document 7: J. J. Koenderink: "Solid Shapes", The MIT Press (1990).

Non-Patent Document 8: N. Kehtarnavaz and S. Mohan: "A framework for estimation of motion parameters from range images", Computer Vision, Graphics, and Image Processing, 45, 1, pp. 88-105 (1989).

Non-Patent Document 9: K. Higuchi, M. Hebert and K. Ikeuchi: "Building 3-D models from unregistered range images", Graphical Models and Image Processing, 57, 4, pp. 315-333 (1995).

Non-Patent Document 10: P. Krsek, T. Pajdla and V. Hlavac: "Differential invariants as the base of triangulated surface registration", Computer Vision and Image Understanding, 87, pp. 27-38 (2002).

Non-Patent Document 11: O. D. Faugeras and M. Hebert: "The representation, recognition, and locating of 3-D objects", The International Journal of Robotics Research, 5, 3 (1986).

Non-Patent Document 12: Y. Kawai, T. Ueshiba, T. Yoshimi and M. Oshima: "Reconstruction of 3D objects by integration of multiple range data", Proceedings of the 11th International Conference on Pattern Recognition, pp. 154-157 (1992).

Non-Patent Document 13: J. V. Wyngaerd and L. V. Gool: "Automatic crude patch registration: Toward automatic 3d model building", Computer Vision and Image Understanding, 87, pp. 8-26 (2002).

Non-Patent Document 14: F. Stein and G. Medioni: "Structural indexing: efficient 3-d object recognition", IEEE Transactions on Pattern Analysis and Machine Intelligence, 14, 2, pp. 125-145 (1992).

Non-Patent Document 15: C. Chua and R. Jarvis: "3-d free-form surface registration and object recognition", International Journal of Computer Vision, 17, 1, pp. 77-99 (1996).

Non-Patent Document 16: A. E. Johnson and M. Hebert: "Using spin images for efficient object recognition in cluttered 3d scenes", IEEE Transactions on Pattern Analysis and Machine Intelligence, 21, 5, pp. 433-449 (1999).

Non-Patent Document 17: D. Huber and M. Hebert: "Fully automatic registration of multiple 3d data sets", Image and Vision Computing, Vol. 21, pp. 637-650 (2003).

Non-Patent Document 18: G. Blais and M. D. Levine: "Registering multiview range data to create 3D computer objects", IEEE Transactions on Pattern Analysis and Machine Intelligence, 17, 8, pp. 820-824 (1995).

Non-Patent Document 19: K. Brunnstrom and A. Stoddart: "Genetic algorithms for free-form surface matching", Proceedings of the 13th International Conference on Pattern Recognition, Vol. 4, pp. 689-693 (1996).

Non-Patent Document 20: L. Silva, O. R. Bellon and K. L. Boyer: "Enhanced, robust genetic algorithms for multiview range image registration", Proceedings of the 4th International Conference on 3-D Digital Imaging and Modeling (2003).

Non-Patent Document 21: G. Sandini and V. Tagliasco: "An anthropomorphic retina-like structure for scene analysis", Computer Vision, Graphics, and Image Processing, 14, pp. 365-372 (1980).

Non-Patent Document 22: K. Hotta, T. Mishima and T. Kurita: "Scale invariant face detection and classification method using shift invariant features extracted from log-polar image", Transactions of IEICE, E84-D, pp. 867-878 (2001).

Non-Patent Document 23: G. Wolberg and S. Zokai: "Robust image registration using log-polar transform", Proceedings of the IEEE International Conference on Image Processing (ICIP2000) (2000).

Non-Patent Document 24: T. Masuda: "Surface curvature estimation from the signed distance field", Proceedings of the 4th International Conference on 3-D Digital Imaging and Modeling, pp. 361-368 (2003).

Non-Patent Document 25: H. Murase and S. Nayer: "Visual learning and recognition of 3-D objects from appearance", International Journal of Computer Vision, 14, pp. 5-24 (1995).

Non-Patent Document 26: S. A. Nene and S. K. Nayar: "A simple algorithm for nearest neighbor search in high dimensions", IEEE Transactions on Pattern Analysis and Machine Intelligence, 19, 9, pp. 989-1003 (1997).

Non-Patent Document 27: P. J. Rousseeuw and A. M. Leroy: "Robust Regression and Outlier Detection", Wiley (1987).

Non-Patent Document 28: D. W. Eggert, A. Lorusse and R. B. Fisher: "Estimating 3-D rigid body transformations: a comparison of four major algorithms", Machine Vision and Applications, 9, pp. 272-290 (1997).

Non-Patent Document 29: "The stanford 3d scanning repository", http://graphics.stanford.edu/data/3Dscanrep/.

Non-Patent Document 30: M. A. Fischler and R. C. Bolles, Random Sample Consensus: A Paradigm for Model Fitting with Applications to Image Analysis and Automated Cartography, Communications of the ACM, Vol. 24, pp. 381-395, 1981

DISCLOSURE OF THE INVENTION

Problems to be Solved by the Invention

It is an object of the present invention to calculate, as an initial value for performing precise registration, a rough positional relation among data described in inconsistent coordinate systems. Therefore, the present invention provides a coarse registration method for range images based on similar image search.

Means for Solving the Problems

In a method and a program for registration of a three-dimensional shape of the present invention, a local range image described in a log-polar coordinate system with a tangential plane set as an image plane is created, an image obtained by normalizing ambiguity concerning an angular axis around the normal is set as a feature, corresponding points are searched by nearest neighbor in a space of a characteristic image, and a positional relation is determined on the basis of the calculated corresponding points.

FIG. 1 is a schematic explanatory diagram of a registration method for a three-dimensional shape according to the present invention.

Step S1: As a characteristic, a local range image described in a log-polar coordinate system with a tangential plane set as an image plane is used. A method is implemented to coarsely represent, for creation at high speed, input range images with signed distance fields and create a local range image at high speed. The present invention is not limited to this implemented method. In creating a local log-polar range image from range images, for example, a creation method for orthogonally projecting the range images directly on a tangential plane can also be used.

Step S2: The created image is periodical in an angular direction and has ambiguity in the angular direction among corresponding images. In order to normalize this ambiguity to be an amount invariable with respect to rotation, the ambiguity is transformed into a power spectrum with respect to an angular axis around the normal using Fourier series expansion. The present invention is not limited to this normalization method and other methods such as an orthogonal expansion method and a moment can also be used.

Step S3: Concerning a feature as the image made invariable with respect to the rotation around the normal, corresponding points are calculated by searching for a nearest pair. In calculating a distance between images, a method can be implemented to calculate a correspondence relation at high speed by performing dimensional compression using only a peculiar image corresponding to a large peculiar value. However, the present invention is not limited to the method of dimensional compression and the method of searching for a nearest point that are used herein.

Step S4: A positional relation among the range images is determined on the basis of corresponding points.

Step S5: A positional relation among all the range images is determined and adopted as a registration result.

In the present invention, a local Log-Polar range image is used as a characteristic to perform coarse registration of plural range images. By coarsely sampling input range images with signed distance fields, it is possible to create the local Log-Polar range image at high speed. The local Log-Polar range image is compressed by Fourier transform and further dimensionally compressed by a peculiar image. A pair of corresponding points is created by nearest neighborhood search. Wrong correspondence is removed by verification, a Euclidean transformation among the respective input range images is estimated by random sampling, and a View Tree is established as a tree structure in which inliers belonging to the transformation are maximized, whereby coarse registration of the input range images is performed. It is possible to create an integrated shape by using a result of the coarse registration as an initial state of a simultaneous registration method.

The method proposed by the present invention has similarities to the methods of Point Signature (see Non-Patent Documents 14 and 15) and the Spin Image (see Non-Patent Documents 16 and 17). A feature similar to the Point Signature is calculated from a characteristic on a circumferential curved line around a point of interest. However, in the proposed method, a depth value from a tangential plane in a disc-like area is directly used. The proposed method is also similar to the Spin Image in that a feature is an image. However, the Spin Image is created by accumulation of sections cut along an image plane perpendicular to a tangential plane. Whereas the Spin Image gives rotation invariance by rotating the image plane around the normal and accumulating sections, the proposed method gives rotation invariance by setting a power spectrum in a rotating direction. Even if a radius is identical, whereas a pattern linearly extending from the origin is created in the Spin Image, pixels are embedded in a local Log-Polar range image and wrong correspondence due to compression by Fourier transform can be verified by correlating the pixels.

An advantage of using a Log-Polar coordinate system is that rotation around the origin can be represented by translation. Another advantage is that a distance from the origin is logarithmically compressed. Portions distant from the origin are coarsely sampled and the number of pixels is relatively smaller than the center portion. Thus, an influence due to inclusion of unmeasured portions can be reduced. An increase in a covered radius due to an increase in pixels in a radial direction of a Log-Polar image is exponential. Thus, a Log-Polar range image including entire range images can be created with a relatively small number of pixels.

When a local Log-Polar range image is applied to registration, covering by the local Log-Polar range image needs to be smaller than an overlapping width between input range images. At present, a sampling interval $\delta$ of a signed distance is set to a size about 1/64 of an object. This is a setting empirically used because a local Log-Polar range image is created and a pair of corresponding points can be searched in a practical time. However, since it is experimentally found that R needs to be equal to or larger than 4, in this case, roughly speaking, an overlapping width needs to be about 1/8 of a range image.

On the other hand, when a shape is extremely simple, if covering is too local, since there are too many shapes locally similar to one another, a probability that pairs of corresponding points are correct decreases. In that case, although it is necessary to increase the covering to some extent, registration between range images with less overlap cannot be performed. In the extremely simple shape, it is also considered that information on a characteristic is localized in fine portions. It is more efficient to extract characteristic points from such range images to not cause an unnecessary pair of corresponding points. However, registration cannot be performed unless portions having characteristic points do not overlap. Further, naturally, it is difficult to register a symmetrical shape only with the shape. Supplementary information such as texture and pre-knowledge is necessary.

What requires a longest calculation time in the proposed method is nearest neighbor search. Concerning the nearest neighbor search, researches in the fields of learning and data mining have been in progress. If a faster algorithm is used, it is possible to realize a substantial increase in speed of the nearest neighbor search. At present, input range images are compressed using a peculiar image. However, empirically, a similar peculiar image tends to be obtained regardless of the input range images. It is also likely that the peculiar image can be shared unless optimality is not taken too seriously.

In the proposed method, practical registration software can be formed by combining a GUI that can interactively correct wrong registration and a simultaneous registration algorithm. The proposed method can also be applied to object recognition, environmental map creation, route search, and the like for robots.

Advantages of the Invention

According to the present invention, it is possible to provide a method of using a local Log-Polar range image as a characteristic and performing coarse registration of plural range images. Information is abundant compared with a feature used in the past and verification of wrong correspondence can also be performed.

BEST MODE FOR CARRYING OUT THE INVENTION (Creation of a Characteristic Image)

Figure 3:
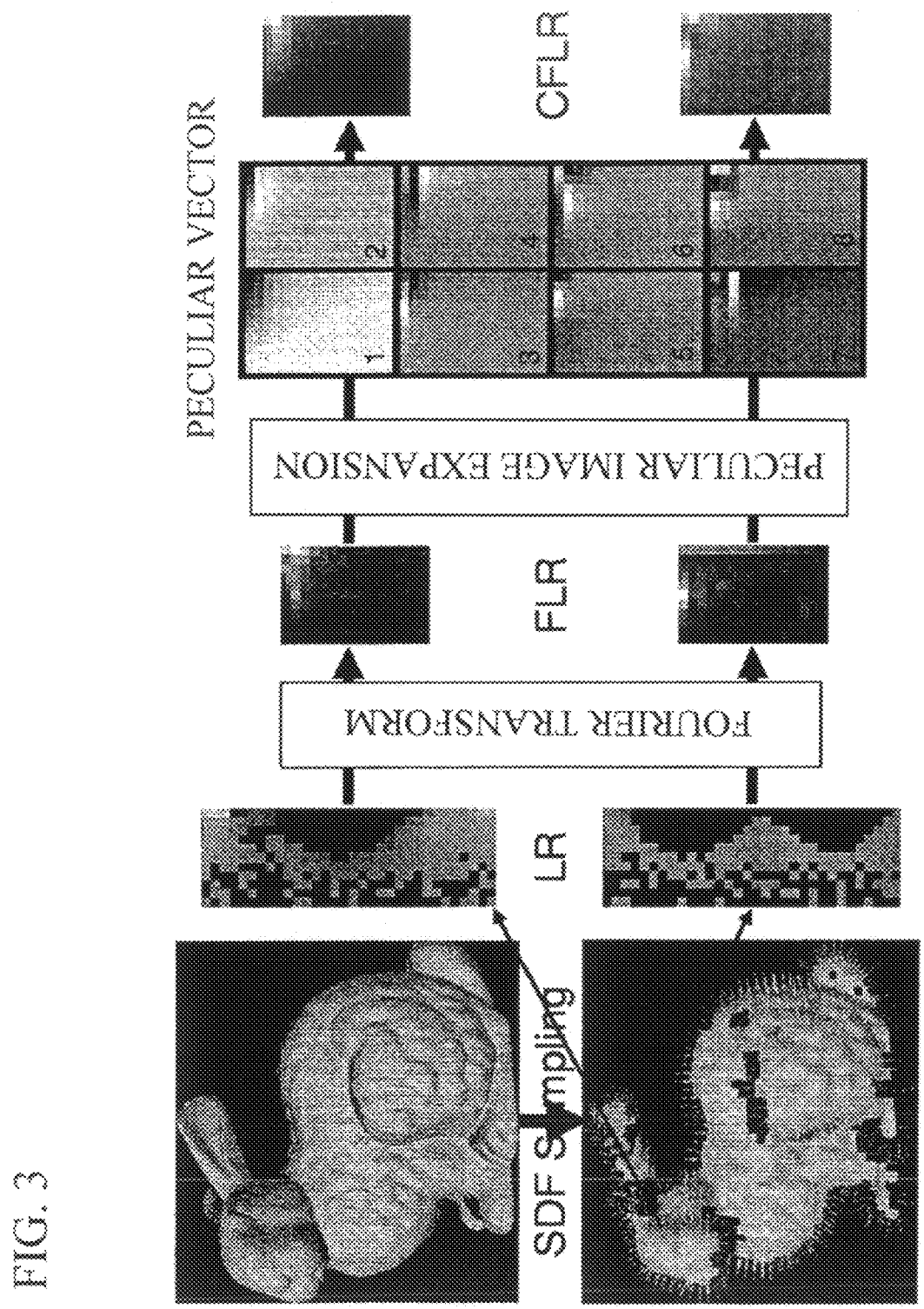
FIG. 3 is a diagram for explaining creation of a characteristic image.

FIG. 3 is a diagram for explaining creation of a characteristic image. As shown in the figure, first, an input range image is coarsely re-sampled in a signed distance field (SDF). A local Log-Polar range image (LR) is created with respective nearest points on the surface as the centers. Unmeasured areas shown black in the figure are filled with a depth value 0. Fourier transform is applied in a θ axis direction to calculate a power spectrum (FLR) and compressed by peculiar image expansion. The FLR can be approximated as linear combination of a small number of peculiar images and a coefficient of the FLR is set as a CFLR. In the figure, a reconfigured FLR is shown as the CFLR. It is seen that the original FLR is approximated. These steps are explained in order below.

(Local Log-Polar Range Image)

Figure 1:
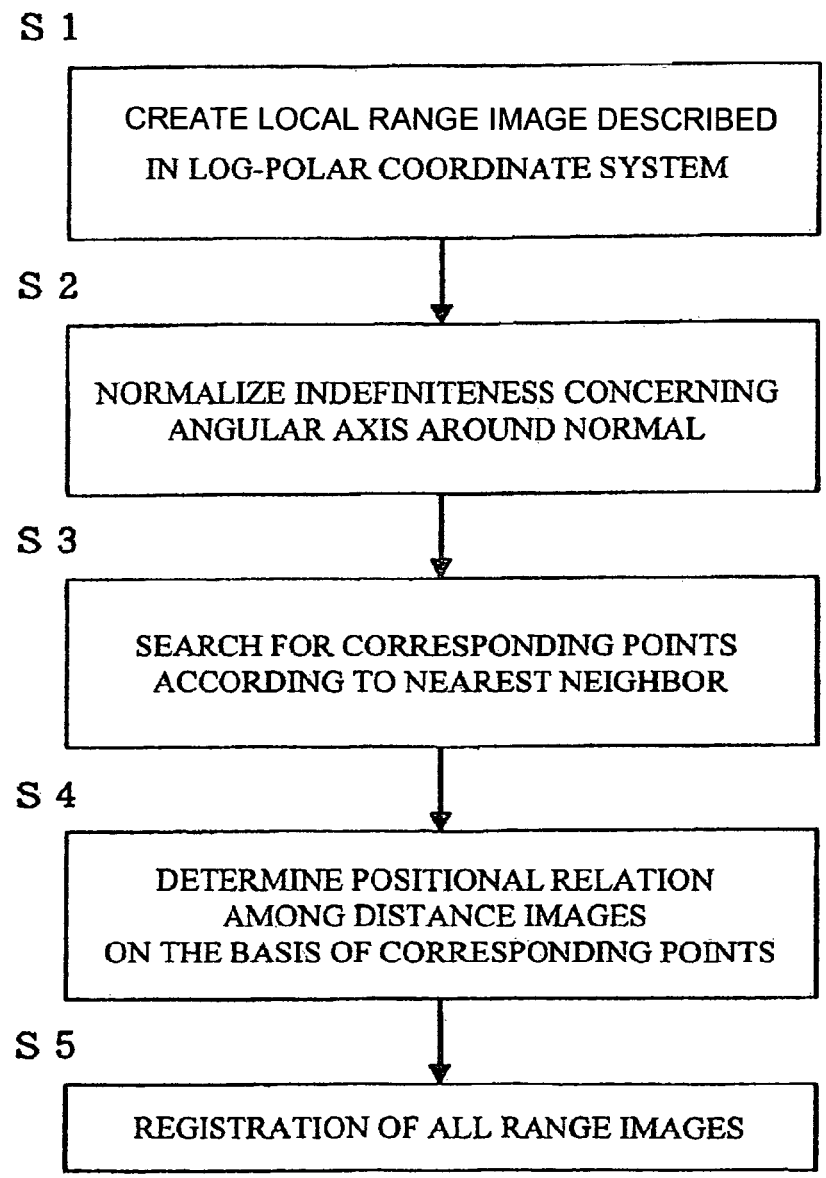
FIG. 1 is a schematic explanatory diagram of a registration method for a three-dimensional shape according to the present invention.
Figure 2:
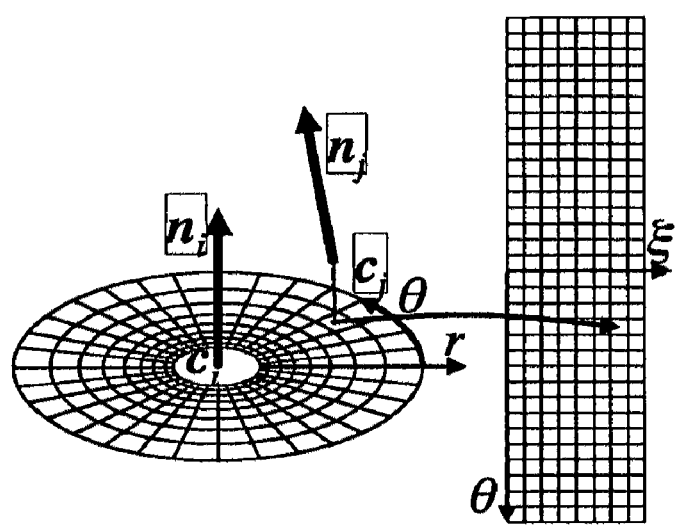
FIG. 2 is a diagram for explaining creation of a local log-polar range image.

An input range image measured for an object body is represented as $S\alpha(1 \leq \alpha \leq NS)$. A local Log-Polar "logarithmic polar coordinate") range image is created from this input range image (FIGS. 2 and 3). As shown in FIG. 3, first, the input range image is re-sampled with a signed distance field (SDF). The local Log-Polar range image (LR) is created with respective nearest points on the surface as the centers. Unmeasured areas shown black in the figure are filled with a depth value 0.

The local Log-Polar range image is a range image represented by a Log-Polar coordinate system (see Non-Patent Documents 21 to 23) spread around a center point. When a position in an orthogonal coordinate system on an image plane is (u, v), a position by the Log-Polar coordinate system is $(\xi, \theta) = (\log r, \arctan(v/u))$. Here, $r = \sqrt{(u^2 + v^2)}$. The local Log-Polar range image (LR) has, as a value, the height in a normal distance of a point on a curved surface orthogonally projected on the Log-Polar coordinate $(\xi, \theta)$.

When it is aimed at registering the input range image at the accuracy of δ, the density of a group of points of the input range image may be extremely high and shape information finer than δ is unnecessary. In order to obtain coarse shape representation, a signed distance field (SDF) of a curved surface used by Masuda is used (see Non-Patent Document 4). A sample of the signed distance field SDF at a sample point p is given by a set of a point closest from p to a curved surface: c, the normal at the point: n, and a signed distance to p: s. These satisfy an equation p=c+sn (see FIG. 9). The normal direction n is calculated as a unit vector in a direction from c to p more stably than a method of calculating the normal by applying a local plane. To calculate range images LR for respective samples from the signed distance field SDF, the respective range images are sampled by the signed distance field SDF. The nearest point c on the curved surface is used as a center point and n is used as a normal vector of a tangential plane. It is sufficient to create the range images LR at the density of about one point around an area within a radius of δ on the curved surface. Thus, a sample satisfying |s|<δ/2 is used.

To create the range images LR with respective nearest points $c_i$ as the centers, among nearest points $c_j$ in the signed distance field SDF of an identical range image, the nearest points $c_j$ that are within the radius Rδ ($\|c_i \cdot c_j\| < R\delta$) and the normals of which are in the same direction ($n_i \cdot n_j > 0$) are used. Respective $c_j$ are orthogonally projected on an image plane as a tangential plane to calculate a Log-Polar coordinate and height $n_i \cdot (c_j - c_i)$ corresponding thereto (FIG. 2). Among heights projected on pixels of an identical Log-Polar coordinate, a maximum value is set as a pixel value. There are unmeasured areas in the range images. However, the height of such portions is set to 0. The range image LR at a nearest point $c^\alpha_i$ of a signed distance field SDF created from an αth range image $S^\alpha$ is represented as $LR[c^\alpha_i](\xi, \theta)$.

To actually create an image, a coordinate value $(\xi, \theta)$ has to be quantized. When a range $(-\pi, \pi)$ that a θ axis can take is divided into 2Nθ pixels, to equally divide both axes of a $(\xi, \theta)$ space, an ith ξ coordinate value needs to satisfy $\xi_i = \log r_i = (\pi/N\theta)i$. The number of pixels necessary for a ξ axis is $N_\xi = (N\theta/\pi)\log(R)$. Here, R is a radius of an area covered by a local image in a unit of δ. An area ξ<0 close to the center is not used. For example, in the case of $N_\theta=16$ and $R=8$, since $N_\xi=11$, a size of the range image LR to be created is $[0, 10] \times [-16, 15] = 352$ pixels. As a local orthogonal coordinate for determining θ of the Log-Polar coordinate, a base formed by a main direction is used (see Non-Patent Document 24). However, processing described below is constituted such that a result does not depend on the method of determination.

(Power Spectrum)

As shown in FIG. 3, Fourier transform in an θ axis direction is applied to the created local range image to calculate a power spectrum (FLR) and the power spectrum is compressed by peculiar image expansion. The FLR can be approximated as linear combination of a small number of peculiar images and a coefficient of the FLR is set as a CFLR. In FIG. 3, a reconfigured FLR is shown as the CFLR. It is seen that the original FLR is approximated.

Since the range image LR is periodical in the θ axis direction ($LR(\xi, \theta) = LR(\xi, \theta + 2\pi)$), the range image LR can be expanded by Fourier series. A power spectrum in the θ axis direction calculated by Fourier expansion is an amount invariable with respect to a phase of θ.

$$FLR(\xi, k) = \left| \frac{1}{\pi} \int_{-\pi}^{\pi} LR(\xi, \theta) e^{-ik\theta} d\theta \right|, \quad \text{[Formula 1]}$$

Here, k is a frequency. The FLR defined here is set as a feature incidental to the respective center points and used for association. Fourier transform can be calculated at high speed using FFT. Since the range image LR is a real function, the FLR is an even function ($FLR(\xi, k) = FLR(\xi, -k)$). Thus, a size of the FLR is a half of the range image LR. For example, in the case of the example described in the preceding section, a size of the FLR is $[0, 10] \times [0, 15] = 176$ pixels. The number of pixels of the FLR is represented as DFLR.

(High-Order Local Autocorrelation Characteristic)

Normalization of ambiguity can also be performed by changing the ambiguity to a high-order local autocorrelation characteristic instead of expanding the ambiguity with Fourier transform into a power spectrum. A high-order correlation function of an image f(r) corresponding to Nth order displacements a1, ..., aN is defined by the following equation.

$$r_f^N(a_1, \ldots, a_N) = \int f(r) f(r+a_1) \ldots f(r+a_N) dr. \quad \text{[Formula 2]}$$

Figure 10:
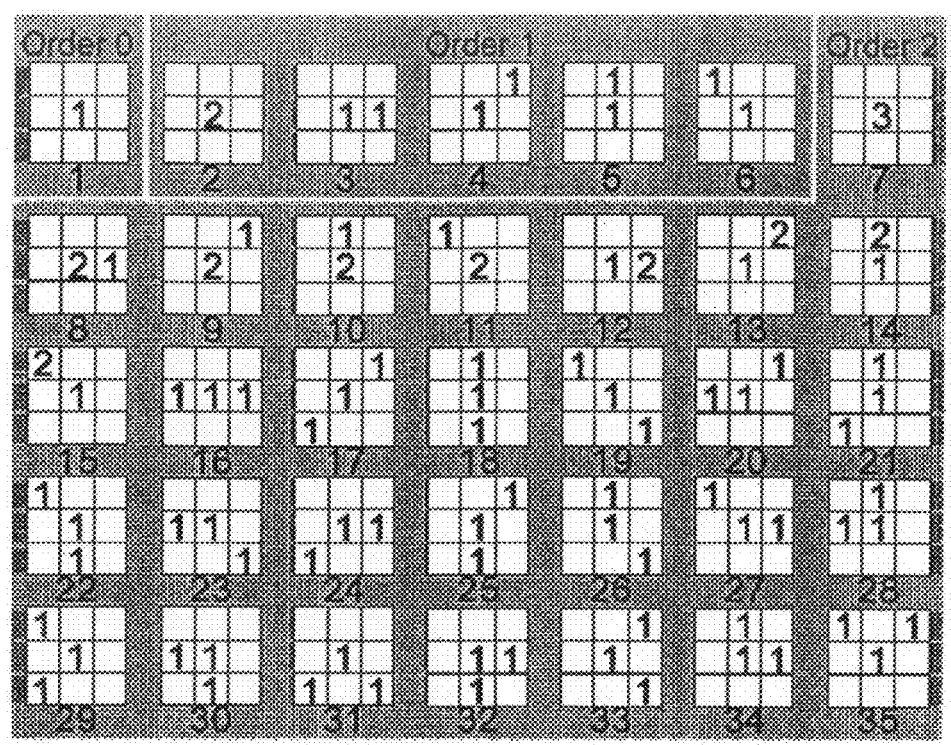
FIG. 10 is a diagram illustrating mask patterns of high-order local autocorrelation.

An infinite number of combinations of displacements and orders can be present. However, when the combinations are applied to image data, in implementation, a1, ..., aN are set in a range of 3×3 with N=0, 1, and 2 and redundancy due to translation is removed. Then, as shown in FIG. 10, the combinations are aggregated into thirty-five patterns. It is possible to extract vectors of thirty-five dimensions as characteristic values for one image. FIG. 10 shows mask patterns of high-order local autocorrelation. A characteristic vector is calculated by calculating a product of pixel values of the number of times of numbers shown in a 3×3 matrix and calculating a sum in the entire image for the respective patterns.

(Dimensional Compression by a Peculiar Image)

As shown in FIG. 3, after a power spectrum (FLR) is calculated by Fourier transform, the power spectrum is compressed by peculiar image expansion. Information of the FLR is unevenly distributed in portions having large ξ and a low frequency. It is possible to compress information into a low-dimensional space by calculating a peculiar image of a set of FLRs. The FLR can be approximated as a linear combination of a small number of peculiar images. A coefficient of the FLR is set as a CFLR. In FIG. 3, a reconfigured FLR is shown as the CFLR. It is seen that an original FLR is approximated.

It is assumed that NFLR pieces of FLRs are created for all input range images. An $N_{FLR} \times D_{FLR}$ matrix $M_{FLR}$ is created by stacking these FLRs as one row. A peculiar vector of a covariance matrix $(M_{FLR})^T M_{FLR}$ of the FLRs can be calculated by subjecting $M_{FLR}$ to singular value decomposition (SVD). When the peculiar vector is represented as $EFLR[c^\alpha_i, 1]$ and an expansion coefficient of the FLRs is represented as $CFLR[c^\alpha_i](1) = EFLR[c^\alpha_i, 1] \cdot FLR[c^\alpha_i]$, the original FLRs can be approximated as follows using a peculiar vector corresponding to D larger peculiar values.

$$FLR[c^\alpha_i] \approx \sum_{l=1}^{D} CFLR[c^\alpha_i](l) \cdot EFLR[c^\alpha_i, l]. \quad \text{[Formula 3]}$$

Corresponding points are searched in a D-dimensional space using this expansion coefficient $CFLR[c^\alpha_i](1)$, $(1 \leq 1 \leq D)$, instead of the FLRs.

When a peculiar image is used for searching for a similar image, normalization for subtracting an average value or setting norms of luminances to the same value 1 is applied (see Non-Patent Document 25). However, in the proposed method, since an absolute value of an FLR cannot be neglected, such normalization is not performed.

(Association)

Figure 4:
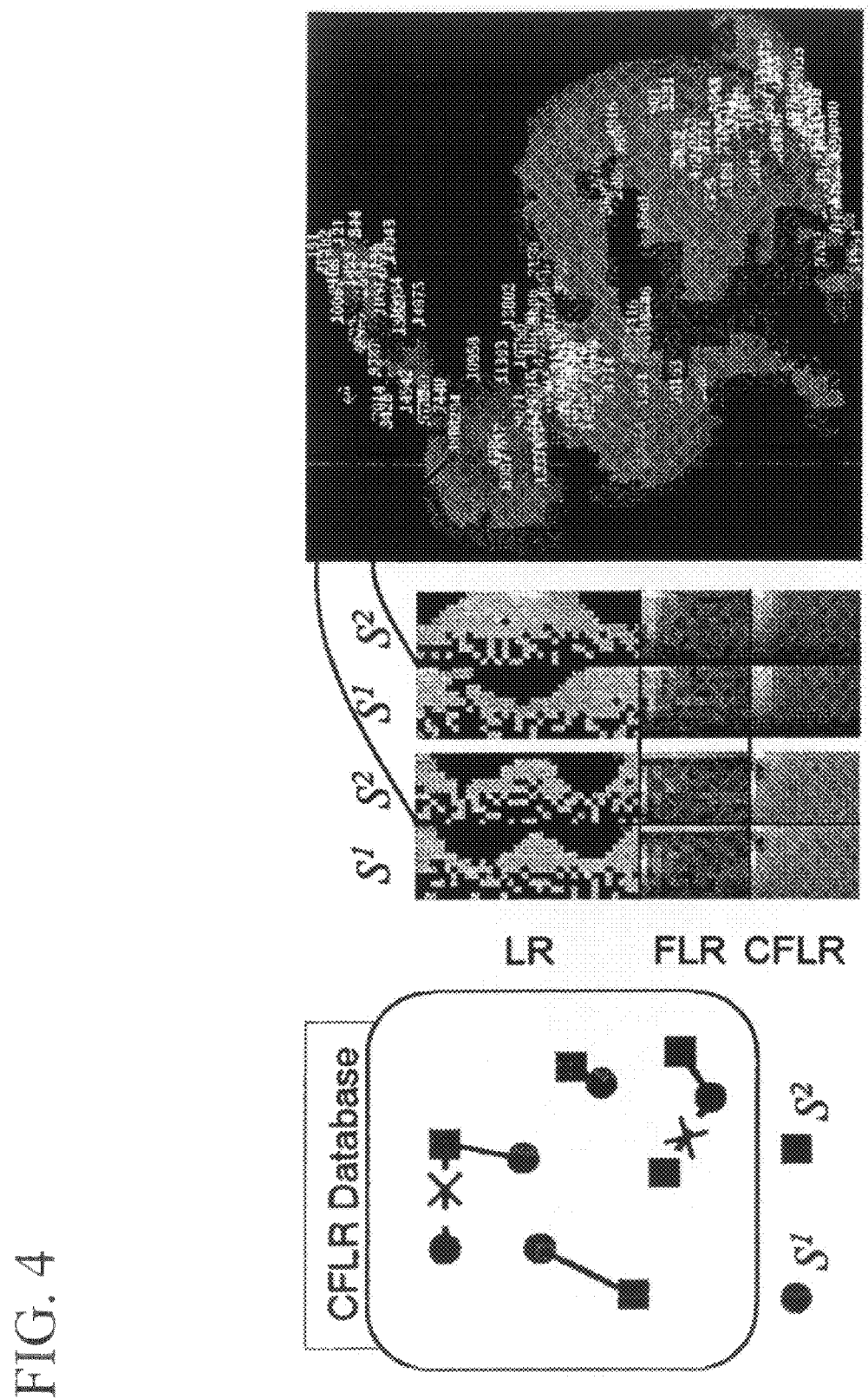
FIG. 4 is a diagram for explaining association.

FIG. 4 is a diagram for explaining association. As shown in the figure, CFLRs close to each other among CFLRs of different input range images are set as pairs of corresponding points (on the left of the figure). Wrong correspondence caused by unnecessary invariance even if FLRs are similar is verified by cross-correlation among the range images LR (in the middle of the figure). A RANSAC is applied among the corresponding points to calculate pairs of corresponding points as inliers with a Euclidean transformation among the input range images (on the right of the figure). These steps are sequentially explained below.

(Search for Corresponding Points)

After CFLRs are created for respective center points of all the input range images, a set of CFLRs closest to each other among the CFLRs of different input range images is searched. Concerning $CFLR[c^\alpha_i]$ calculated for a center point $c^\alpha_i$ of an input range image $S^\alpha$, when $CFLR[c^\beta_j]$ calculated for a center point $c^\beta_j$ of another input range image $S\beta (B \neq \alpha)$ is the closest, correspondence of the point $[c^\alpha_i, c^\beta_j]$ is added to a list of corresponding points.

Since the CFLRs are D-dimensional vectors, it is possible to apply a general-purpose search algorithm for a nearest neighbor point can be applied. For example, the method proposed by Nene and Nayer (see Non-Patent Document 26) can be used. This is a simple algorithm for extracting, using projection on respective axes, candidate points in a hypercube having the width of 2ϵ around a point for which nearest neighbor is searched and full-searching for closest points in the candidates.

To apply this algorithm, it is important to set a threshold. If the threshold ϵ is too large, candidates to be full-searched increase and search efficiency falls. If the threshold ϵ is too small, search of nearest points fails. In this implementation, the threshold ϵ is set as follows.

$$\epsilon = \sqrt[D]{V/N_{FLR}}/2 \qquad \text{[Formula 4]}$$

V indicates a volume in which points are distributed. The volume V is estimated from a minimum width covering a half number of points used in estimating one-dimensional LMSs (Lease Median of Squares) on the respective axes (see Non-Patent Document 27).

After the respective CFLRs are associated with the nearest neighbor points, corresponding points not in nearest neighbor each other are eliminated (on the left in FIG. 4).

(Verification by Cross-Correlation)

As a characteristic of an FLR, invariance with respect to a phase in a θ axis direction represented by the following equation is a desirable characteristic.

$$LR[c_i^\alpha](\xi,\theta)=LR[c_j^\beta](\xi,\theta+\theta_0) \qquad \text{[Formula 5]}$$

However, the FLR also has invariance with respect to a sign and a direction represented by the following equation. It cannot be said that the invariance is desirable.

$$LR[c_i^\alpha](\xi,\theta)=-LR[c_j^\beta](\xi,\theta)$$

$$LR[c_i^\alpha](\xi,\theta)=LR[c_j^\beta](\xi,\theta_0-\theta) \qquad \text{[Formula 6]}$$

Since a power spectrum only in the θ axis direction is used, the FLR also has invariance with respect to shift having a different phase depending on a value of ξ.

Wrong correspondence due to such unnecessary invariance can be verified by calculating cross-correlation among the range images LR. $LR[c_j^\beta](\xi, \pm 0+\Delta\theta)$ with a direction ± and a phase Δθ changed can be created with simple operation such as shift and replacement of a vector element on the basis of a characteristic of the Log-Polar coordinate system. Concerning a pair of $LR[c_i^\alpha]$ and $LR[c_j^\beta]$ associated with each other, a direction and a phase are changed to calculate the following normalization correlation.

$$XLR[c_i^\alpha, c_j^\beta](\pm,\Delta\theta) = \frac{LR[c_i^\alpha](\xi,\theta) \cdot LR[c_j^\beta](\xi,\pm\theta+\Delta\theta)}{\|LR[c_i^\alpha](\xi,\theta)\| \cdot \|LR[c_j^\beta](\xi,\theta)\|} \qquad \text{[Formula 7]}$$

If maximum values for all combinations of ± and Δθ are smaller than a threshold (in this implementation, 0.5) or if maximum values are obtained in reverse directions "direction is "−"), a correspondence relation between this pair of points is discriminated as an error and the pair of points are removed (in the middle in FIG. 4).

In the present implementation, the range images LR are erased from a memory at a stage when the FLRs are created and only the range images LR necessary for performing this verification are recreated. However, in an experimental result, sufficiently high execution speed is obtained (see an example).

(Verification of a Rigid Body)

A geometric transformation necessary for registering range images measured from plural viewpoints is a Euclidean transformation representing a motion of a rigid body. One Euclidean transformation should correspond to each pair of input range images.

Paris of points created by the preceding procedures and remaining without being removed by the verification are classified for each pair of input range images corresponding thereto. For example, a pair of corresponding points $[c_i^\alpha, c_j^\beta]$ is classified into an element of a pair of input range images $[S^\alpha, S^\beta]$. A RANSAC is applied to pairs of corresponding points belonging to the respective input range images to estimate a Euclidean transformation and calculate pairs of corresponding points as inliers.

Three pairs $[c_{i1}^\alpha, c_{j1}^\beta]$, $[c_{i2}^\alpha, c_{j2}^\beta]$, and $[c_{i3}^\alpha, c_{j3}^\beta]$ are selected from pairs of corresponding points belonging to the pair of input range images $[S^\alpha, S^\beta]$. If there are three pairs of corresponding points, a Euclidean transformation $T=\{R, t\}$ can be uniquely calculated (see Non-Patent Document 28). This transformation is applied to corresponding points belonging to the same pair of input range images. Pairs of points satisfying a condition $\|Tc_i^\alpha \cdot c_j^\beta\|<\delta$, $Rn_i^\alpha \cdot n_j^\beta > \tau n$ (in the implementation, $\cos(\pi/8)$) are regarded as inliers and the number of the pairs of points is counted. As a method of selecting the three pairs of corresponding points, all combinations of pairs of corresponding points are selected when the number of corresponding points is small and pairs of corresponding points are selected at random when the number of corresponding points is large. These procedures are repeated. In the implementation, for pairs of input range images having pairs of corresponding points exceeding twenty-two, pairs of corresponding images are selected at random 1000 times. A transformation to which a largest number of inliers belong between the pair of input range images $[S^\alpha, S^\beta]$ is set as a transformation $T^\beta_\alpha$ between the pair of input range images (on the right in FIG. 4).

(View Tree: Creation of a Tree Structure)

Figure 5:
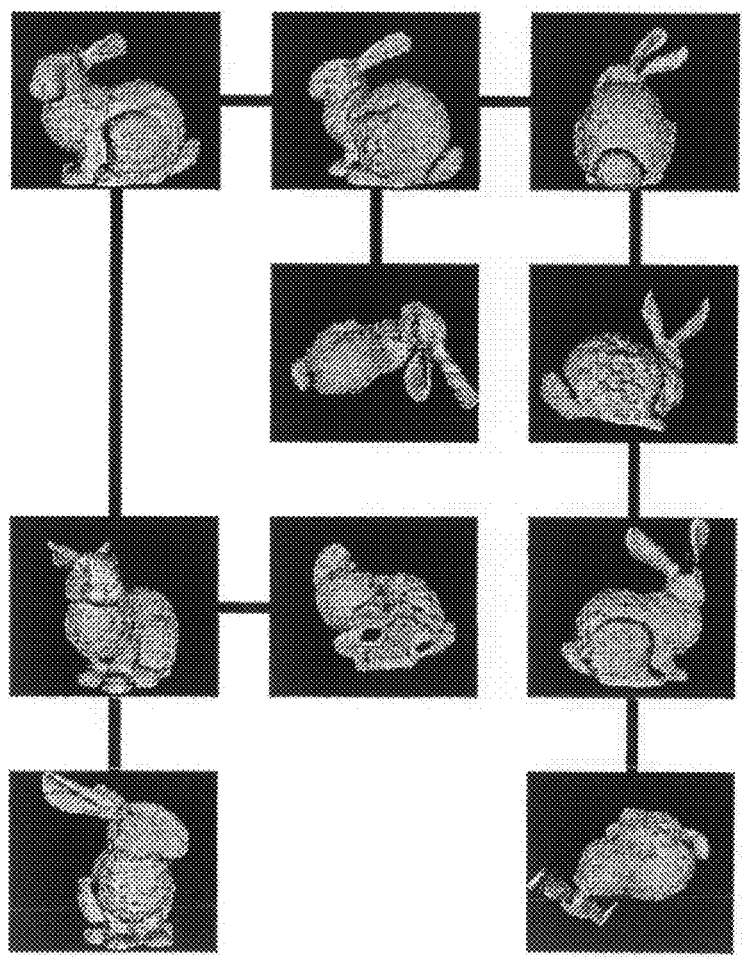
FIG. 5 is a diagram showing a table (in an upper part of the figure) of numbers of inliers selected by a RANSAC algorithm for respective pairs of input range images and a View Tree (in a lower part of the figure) created as a spanning tree of input range images for maximizing all the numbers of inliers.

FIG. 5 shows a table (in an upper part of the figure) of numbers of inliers selected by a RANSAC algorithm for respective pairs of input range images and a View Tree (in a lower part of the figure) created as a spanning tree of input range images for maximizing all the numbers of inliers.

After inliers are selected by the RANSAC among the respective range images, a spanning tree for maximizing the numbers of inliers as a whole is formed. This tree structure of the input range images is referred to as a View Tree. For example, in FIG. 5, there are one-hundred forty-three, twenty-two, and five inlier pairs of corresponding points in pairs of input range images $[S_1, S_2]$, $[S_2, S_3]$, and $[S_1, S_3]$. To connect these three input range images, $[S_1, S_2]$ and $[S_2, S_3]$ are sufficient. $[S_1, S_3]$ with small number of inliers is not used. A View Tree can be formed by an algorithm described below.

1. An empty graph is prepared and all pairs of input range images are set as objects.

2. The following operation is repeated until a maximum number of inliers of the object pairs of input range images is reduced to be equal to or smaller than τ connections.

2.1. Pairs of input range images having the maximum number of inliers are added to the graph.

2.2. Pairs of input range images, range images at both ends of which are connected to the graph, are removed from the objects.

According to this algorithm, it is possible to form a View Tree as a spanning tree in which a minimum number of inliers is equal to or larger than τ connections (in the implementation, five) and a sum of numbers of inliers formed is maximized (FIG. 5).

With a transformation of a base range image Sbase (S1 in FIG. 5) set as $Tbase=\{I_{3\times3}, 0_3\}$, Euclidean transformations $T^\beta_\alpha$ of respective pairs of input range images corresponding to sides of the View Tree are sequentially applied. In this way, relative Euclidean transformations $T_\alpha$ with respect to base range images $S_{base}$ of the respective input range images $S^\alpha$ can be calculated.

(Correction)

If the Euclidean transformations $T_\alpha$ of the respective input range images $S^\alpha$ are determined, an overall rough shape can be assembled. Correction in the entire shape is performed using pairs of corresponding points not used in the View Tree. Among all the pairs of points left by the verifications, pairs of points satisfying a condition $\|T_\alpha c^\alpha_i - T_\beta c^\beta_j\| < \delta$, $R_\alpha n^\alpha_i \cdot R_\beta n^\beta_j > \tau_n$ are selected. The transformations $T_\alpha$ is updated by associating, for the respective input range images $S^\alpha$, $c^\alpha_i$ with midpoints $(T_\alpha c^\alpha_i + T_\beta c^\beta_j)/2$ of the pairs of corresponding points. The selection of pairs of corresponding points and the update of the transformations are repeated until fluctuation in a registration error among the pairs of corresponding points satisfying the condition is reduced to be sufficiently small.

In the correction among corresponding points, only associated portions are used. Moreover, registration errors remain accumulated among input range images in positions away from one another in the View Tree. Such registration errors can be eliminated by applying a simultaneous registration algorithm for all input range images. Here, an algorithm proposed by Masuda (see Non-Patent Document 4) is used. A fine shape can be obtained by, first, subjecting a coarse registration result in a range of registration accuracy δ estimated by the proposed method to simultaneous registration with a sampling interval set as δ and reducing the sampling interval (FIG. 6).

Figure 6:
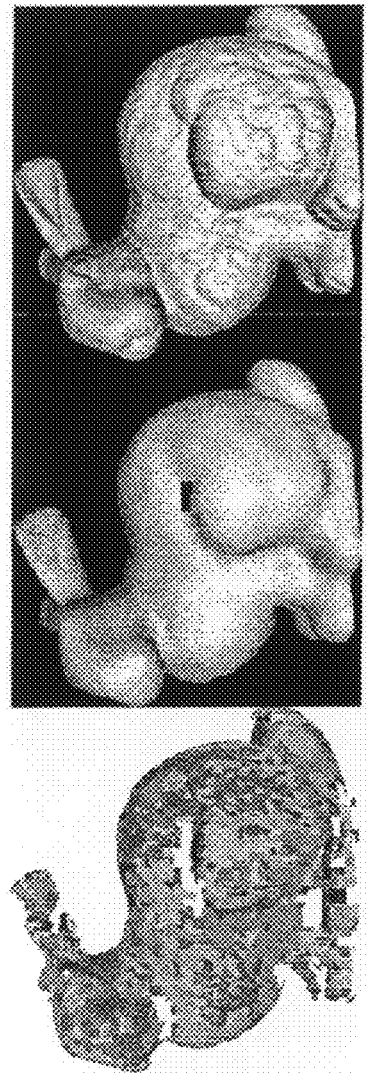
FIG. 6 is a diagram showing input range images (on the left in the figure) registered with coarseness of δ=4 mm by the proposed method, a shape model (in the middle of the figure) integrated by a simultaneous registration method with the input range images as an initial value, and a fine shape model (on the right of the figure) created by reducing a sampling interval to δ=0.5 mm with a result of the simultaneous registration method as an initial value.

FIG. 6 shows input range images (on the left of the figure) registered with coarseness of δ=4 mm by the proposed method, a shape model (in the middle of the figure) integrated by the simultaneous registration method with the input range images as an initial value, and a fine shape model (on the right of the figure) created by reducing a sampling interval to δ=0.5 mm with a result of the simultaneous registration method as an initial value.

The simultaneous registration algorithm used here has a point common to the proposed method in that a signed distance field (SDF) is used as a description of a shape. Shape integration is performed simultaneously with registration and an integrated shape is described in the signed distance field (SDF). Thus, it is possible to dividedly process a large data set by using, as an input of the proposed method, the signed distance field SDF in which a new range image and other portions are integrated.

Example 1

The range image used in the explanation of the method described above is a data set called 'Bunny' acquired from the Stanford 3D Scanning Repository (see Non-Patent Document 29). The data set is formed by ten range images in total (FIG. 5). An object had a size of about 25 cm and the signed distance field SDF was created at a sampling interval of δ=4 mm. As local Log-Polar range images, $N_{FLR}$=19156 images in total were created with a setting of $N_\theta$=16, R=8, and $D_{FLR}$=11×16=176. These images were compressed by D=8 peculiar images (FIG. 3) and an accumulation contribution ratio at that point was 92.9%. Nearest points for 17916 points were searched with determined by the method described above. Among the points, 3711 pairs were pairs of corresponding points that were nearest neighbors each other. 1129 pairs were left by verification by cross-correlation, 462 pairs were left as inliers by verification of rigidity, and a View Tree was formed by 366 pairs of corresponding points (FIG. 5). As a calculation time, the reading of the input range images and the sampling of the signed distance field SDF required two minutes, the creation and the compression of the local Log-Polar range images required four minutes, the search for the nearest points required ten minutes, and the verification of the pairs of corresponding points required one minute. The calculation time was measured by a Xeon 1.7 GHz single processor.

Figures 8, 9:
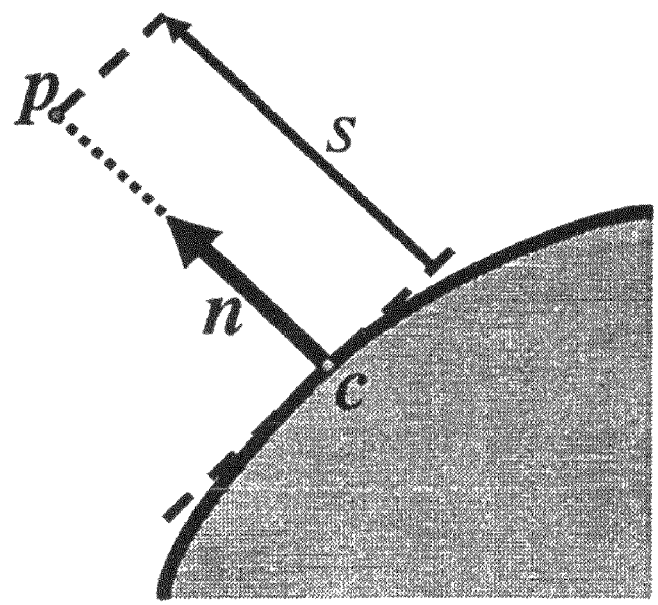
FIG. 8 is a table showing a result obtained by applying different settings to identical data.
FIG. 9 is a diagram for explaining a signed distance field of a curved surface.

FIG. 8 is a table showing a result obtained by applying different settings to identical data. This table shows a result of registration of Bunny data according to various settings. Here, $D_{FLR}=N_\theta \times N_\xi$, CP % indicates an accumulated contribution ratio at the time when dimensions up to a D-dimension are used, and #inliers indicates a total number of inliers forming a View Tree.

When R and D were too small, registration was unsuccessful. This considers to indicate that correct pairs of corresponding points were not found because an information amount was too small. Registration could be performed even if $N_\theta$ was set to a small value. However, the number of inliers finally left was small and performance was deteriorated. R=4, $D_{FLR}$=8, and $N_\theta$=4 are settings at least generally required. When D is set large, performance is improved. However, a dimension of a space in which nearest points are searched increases and a long calculation time is required. When $N_\theta$ is set large, a DFLR increases and a calculation amount of an SVD increases. However, even if the $N_\theta$ is set large, performance is not improved. On the other hand, when R is set too large, registration between input range images with less overlap fails. Thus, smaller R in a range in which a certain degree of an information amount can be secured is suitable for registration.

Example 2

Figure 7:
FIG. 7 is a diagram showing a result of coarse registration of input range images (on the left of the figure), an integrated shape model (in the middle of the figure) obtained by simultaneously registering the input range images, and a fine integrated shape model (on the right of the figure) created.
Figure 7:

The proposed method was applied to 'Dragon' data set also acquired from the Stanford 3D Scanning Repository (see Non-Patent Document 29) (FIG. 7). FIG. 7 is a diagram showing a result of coarse registration of input range images (on the left of the figure), an integrated shape model (in the middle of the figure) obtained by simultaneously registering the input range images, and a fine integrated shape model (on the right of the figure) created.

The 'Dragon' data set includes seventy range images in total. First, coarse registration was applied to thirty range images among the range images by the proposed method. A size of an object was set to about 25 cm, δ was set to 4 mm, $N_\theta$ was set to 8, R was set to 4, and $D_{FLR}$ was set to 8. 38745 local Log-Polar range images were created, a View Tree was formed by 609 pairs of corresponding points, and correction by pairs of corresponding points was performed using 738 pairs (on the left in FIG. 7). A calculation time was about 1 hour.

With a result of the coarse registration set as an initial value, an integrated shape was created by applying the simultaneous registration algorithm with the same δ=4 mm (in the middle in FIG. 7). A procedure for coarsely registering range images to create an integrated shape was repeated four times for the remaining forty range images to add created integrated shapes to the integrated shape created by the simultaneous registration algorithm. In this way, shape integration was performed for all the range images. A detailed shape model in which all the range images are used could be created by reducing a sampling interval to δ=1 mm on the basis of a result of the shape integration (on the right in FIG. 7).

In processing large data sets, if all the data sets are processed at a time, a load of search for pairs of corresponding points is large. When the number of data increases, it is difficult to grasp a relation among the data. Thus, it is useful to divide and process the data. Various methods of division are conceivable. Besides the method adopted here, for example, a method of classifying range images for each of portions, creating an integrated shape for each of the portions, registering integrated shapes one another, and finally performing simultaneous registration again using the range images is also conceivable.

The present invention has been explained on the basis of the illustrated examples. However, the present invention is not limited to the examples described above and includes other constitutions that those skills in the art easily modify in a scope described in claims.

The invention claimed is:

1. A method for registration of a three-dimensional shape, the method comprising:
   creating, based on an input range image sampled by an image sensor, a local range image described in log-polar coordinate system with a tangential plane of a point on a curved surface set as an image plane, where the log-polar coordinate system is spread around the point on the curved surface;
   expanding the local range image by Fourier series expansion to calculate a power spectrum with respect to an angular axis around normal at the point on the curved surface and setting the calculated power spectrum as a feature;
   searching for corresponding points having nearest features between different input range image to calculate a correspondence relation among the points; and
   determining a positional relation between the different input range images on the basis of the calculated corresponding points, and,
   wherein, when the correspondence relation of the feature is calculated, the power spectrum is dimensionally compressed by being expanded in a peculiar space using a peculiar vector and a search for corresponding points having nearest features is performed in a dimensionally compressed space.

2. The method for registration of a three-dimensional shape according to claim 1, wherein input range images are coarsely represented by a signed distance field to create the local range image at high speed.

3. The method for registration of a three-dimensional shape according to claim 1, wherein registration between three-dimensional shapes described in a signed distance field is enabled by creating the local range image from the signed distance field.

4. A non-transitory computer-usable storage medium having a program comprising computer readable instructions stored thereon for execution by a processor to perform a method for registration of a three-dimensional shape, the method comprising:
   creating, based on an input range image sampled by an image sensor, a local range image described in log-polar coordinate system with a tangential plane of a point on a curved surface set as an image plane, where the log-polar coordinate system is spread around the point on the curved surface;
   expanding the local range image by Fourier series expansion to calculate a power spectrum with respect to an angular axis around normal at the point on the curved surface and setting the calculated power spectrum as a feature;
   searching for corresponding points having nearest features between different input range images to calculate a correspondence relation among the points;
   determining a positional relation between the different input range images on the basis of the calculated corresponding points; and
   creating a shape model by registering plural input range images using the determined positional relation among all the range images as an initial value, and
   wherein, when the correspondence relation of the feature is calculated, the power spectrum is dimensionally compressed by being expanded in a peculiar space using a peculiar vector and a search for corresponding points having nearest features is performed in a dimensionally compressed space.

* * * * *